United States Patent
Åström

Patent Number: 5,697,232
Date of Patent: Dec. 16, 1997

[54] DEVICE FOR PREVENTING UNAUTHORIZED USE OF AN ENGINE

[76] Inventor: Sten Åström, Hållsäter 8019, 824 00 Hudiksvall, Sweden

[21] Appl. No.: 617,872

[22] PCT Filed: Oct. 3, 1994

[86] PCT No.: PCT/SE94/00904

§ 371 Date: Mar. 21, 1996

§ 102(e) Date: Mar. 21, 1996

[87] PCT Pub. No.: WO95/09749

PCT Pub. Date: Apr. 13, 1995

[30] Foreign Application Priority Data

Oct. 1, 1993 [SE] Sweden ................................ 9303210

[51] Int. Cl.$^6$ ................................................ E05B 65/00
[52] U.S. Cl. ................... 70/57; 70/165; 70/163; 123/198 B
[58] Field of Search .................... 70/57, 58, 175–179, 70/166–169, 163, 14, 237; 294/100; 123/198 B

[56] References Cited

U.S. PATENT DOCUMENTS

| | | | |
|---|---|---|---|
| 1,322,905 | 11/1919 | Just | 70/178 |
| 1,771,382 | 7/1930 | Kramer | 70/231 |
| 1,782,584 | 11/1930 | Ryan | 70/178 |
| 1,998,050 | 4/1935 | Gasdorf | 70/232 |
| 2,532,972 | 12/1950 | Vertin | 294/100 |
| 2,584,545 | 2/1952 | Caferro | 294/100 |
| 2,669,896 | 2/1954 | Clough | 294/100 |
| 2,802,691 | 8/1957 | Barr | 294/100 |
| 4,442,619 | 4/1984 | McCarley | 294/100 |

FOREIGN PATENT DOCUMENTS

| | | |
|---|---|---|
| 7606432 | 9/1978 | Sweden . |
| 7714838 | 3/1980 | Sweden . |
| 2011522 | 7/1979 | United Kingdom . |
| 1577812 | 10/1980 | United Kingdom . |

*Primary Examiner*—Darnell M. Boucher
*Attorney, Agent, or Firm*—Burns, Doane, Swecker & Mathis, L.L.P.

[57] ABSTRACT

The invention relates to a device (1) for preventing unauthorized use of an engine provided with a spark plug, from which the ignition cable has been removed and conditions have been provided which will enable the spark plug to be covered and therewith made irremovable, or at least not readily removable. The device includes a sleeve (6) which can be fitted over a spark plug (2) to which no ignition cable is connected, and a spark-plug coacting locking part (4, 5). The sleeve (6) and the locking part can be locked in a position relative to one another or in a position in which they are able to move relative to one another, through the medium of a locking device (7). The locking part (4, 5) which coacts with the spark plug (2) can be moved relative to the sleeve (6) in a direction pertinent to a sleeve center line (6a), from a position in which it is located outside the sleeve and in which the spark plug (2) is exposed or can be embraced by the sleeve, to a position inside the sleeve (6) in which the spark plug is embraced and in which the locking part (4, 5) is able to rotate freely around the cylindrical base part (2a) of the enclosed spark plug.

7 Claims, 1 Drawing Sheet

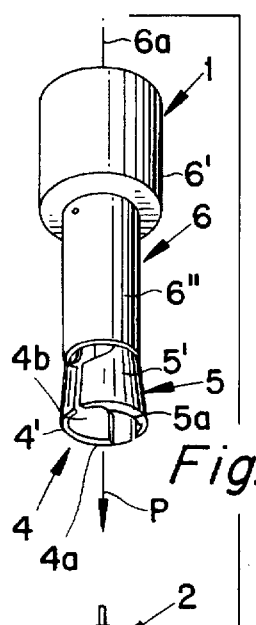
Fig. 1
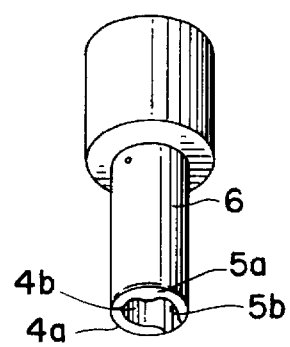
Fig. 2
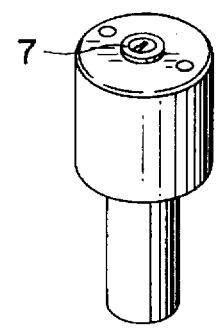
Fig. 3
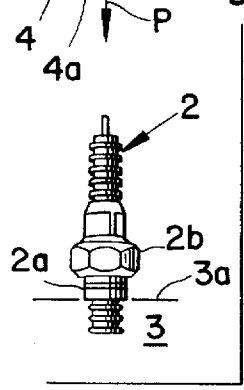
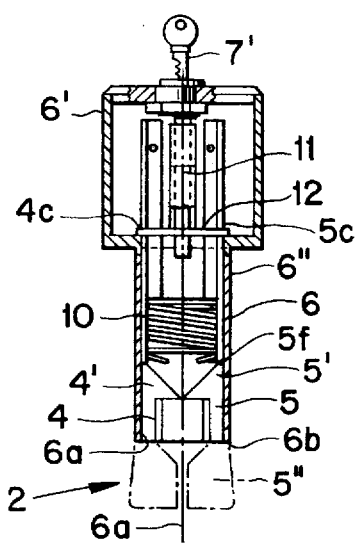
Fig. 4
Fig. 5
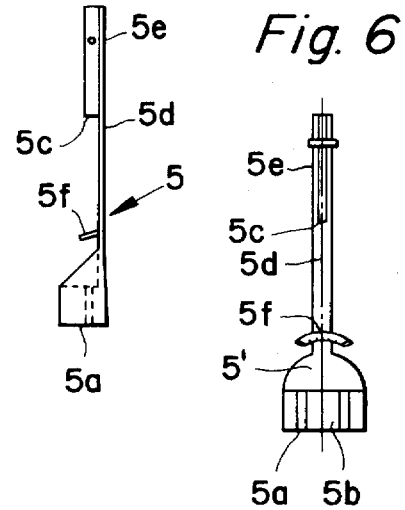
Fig. 6
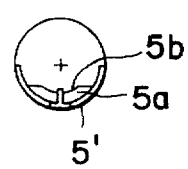
Fig. 7
Fig. 8
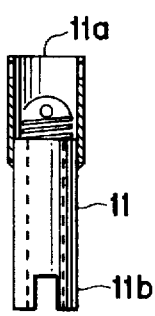
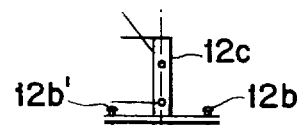
Fig. 9
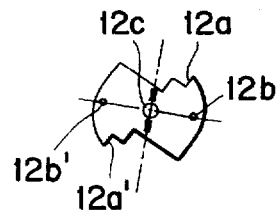
Fig. 10

1

DEVICE FOR PREVENTING UNAUTHORIZED USE OF AN ENGINE

TECHNICAL FIELD

The present invention relates to a device for preventing unauthorized use of an engine provided with spark plugs, and particularly, but not exclusively, to devices of the kind with which it is necessary to disconnect the ignition cable from a spark plug and then create conditions which enable the spark plug to be covered by the device in a manner which will prevent the device from being readily removed from the spark plug.

The invention is based on a device which includes a sleeve which can be fitted over a spark plug when the ignition cable has been removed therefrom and which has a locking part which coacts with the spark plug, wherein the sleeve and said locking part can be locked in mutual relative positions or can be positioned so as to be movable relative to one another.

Although the invention can be applied with different types of engines, it finds particular use in preventing the theft of motorcycles, snow scooters and like vehicles, or at least making such theft difficult to achieve.

DESCRIPTION OF THE PRIOR ART

Swedish Patent Application 7606432-8, Publication No. 404,159, teaches a method and a device for preventing unauthorized use of internal combustion vehicles, ships, engine-driven tools and implements, and simply engines or motors, and is based on the removal of spark plugs from an engine and replacing the spark plugs with a body which has an external screw-thread which corresponds to a spark plug housing attachment and which is rotatably or pivotally connected to a sleeve-like part which extends from the engine block and intended to encircle a locking mechanism.

The locking mechanism can be brought by means of a key to a position in which it joins the screw-threaded part non-rotatably to the sleeve-like part when mounting the body on and removing said body from the engine block, wherein the locking mechanism is also adapted to be brought, with the aid of said key, to a position in which the sleeve-like part extending from the engine block is able to rotate freely in relation to the threaded attachment part and therewith make it impossible to remove the body from a position in which it is attached to the engine block.

Swedish Patent Application 7714838-5, publication No. 413,046, teaches a corresponding device referred to as a spark plug lock, which is intended to improve the construction described in the introduction, by using a locking device which does not require removal of the spark plug. However, this construction requires the provision of a separate holder which is fitted between the spark plug and the engine block.

This known device includes an outer cylindrical housing which is intended to embrace a key-operated lock mechanism and a sleeve-like rotor which coacts with the housing and is enclosed within said housing and which, with the aid of the lock mechanism, can be caused to lock non-rotatably with the housing and to be arranged for rotation in relation to the housing respectively.

The rotor interior includes a space for receiving the isolator of a spark plug and ignition line connection means.

The rotor is provided at its bottom end with an internal screw-thread which is intended to mesh with an external screw-thread on a cylindrical holder, this holder including an upper hexagonal recess which is intended to receive a hexagonal spark plug, and therebeneath a cylindrical space which receives the cylindrical base part of the spark plug, wherein the height or vertical extension of the holder is such as to enable a spark plug with the holder fitted thereto to be screwed into the engine block in a normal manner.

DISCLOSE OF THE INVENTION

TECHNICAL PROBLEMS

When studying the present state of the art as described above, it will be seen that a technical problem resides in providing a locking device/particularly a spark plug locking device, which is constructed so as to enable it to be brought into and out of coaction with a spark plug without needing to fit additional devices, such as a holder, to the spark plug.

Another technical problem with regard to a locking device of the aforedescribed kind is one of providing conditions which will enable the locking device to lock and to release the spark plug, simply by enabling a sleeve and a part of the locking device to lock together in a position of mutual orientation or to be movable relative to one another in a direction pertinent to a centre line on the sleeve.

It will also be seen that a technical problem is one of realizing the advantages that are afforded by enabling a locking part that coacts with the spark plug to be movable in a direction pertinent to a centre line on the sleeve in relation to said sleeve from a sleeve-external position, in which the spark plug is located outside the sleeve and can be embraced thereby, to a position in which the spark plug is enclosed within the sleeve and in which said locking part is able to rotate freely around the enclosed spark plug and thus around the bottom cylindrical base part thereof.

It will also be seen that another technical problem is one of realizing the significance of providing said locking part with shoulders or lugs that can be inserted to and withdrawn from a position beneath the hexagonal collar of the spark plug, and the movement of which shoulders is controlled by relative displacement between said locking part and said sleeve, so as to be enclosed in their inserted position and held firmly adjacent the spark plug while enabling relative movement in relation to the spark plug.

It will also be seen that another technical problem is one of realizing the significance of biassing said part towards and to a position outside the sleeve with the aid of a spring, and also in providing a spring-accommodating space within a cylindrical part or sleeve.

It will also be seen that a technical problem is one of realizing the advantages that are afforded by enabling said locking part to be locked to said sleeve by means of the locking device, solely when located within the sleeve.

Another technical problem is one of realizing the significance of forming said locking part from two diametrically opposed arm-like locking or gripping elements which can be displaced and/or deflected towards and away from one another through the medium of said displacement and spring bias.

A further technical problem is one of realizing the advantages that are afforded when the locking device includes a spring-activated disc or plate which is able to rotate under a spring force to a position in which said locking part is locked in relation to the sleeve in the inner position relative to the sleeve, and when the plate or disc can be turned by the key of said locking device against the force of a spring and therewith release said part from the sleeve.

Another technical problem is one of realizing the advantages that are afforded when each of the locking elements is provided with an individual, obliquely downwardly directed projection against which a spring rests, and by directing the spring force such as to bring said locking elements into an outwardly directed position when said elements are not in contact with the sleeve.

It will also be seen that a technical problem is one of realizing that the sleeve shall have a circular cross-section and that the aforesaid locking elements, in their outwardly directed position, are latched against coaction with opposing inner surface parts of the sleeve.

It will also be seen that a technical problem resides in realizing the significance of, and the advantages that are afforded when attaching the inventive device to a spark plug, of providing the sleeve with a narrower part, a spark plug encircling part, and a broader part, a locking device encircling part.

Another technical problem is one of realizing the significance of positioning said disc or plate adjacent the narrower part and adjacent the broader part within the sleeve, which has a circular cross-section, and causing the disc or plate to be pressed against inner parts of said part by a spring force.

SOLUTION

With the intention of solving one or more of the aforesaid technical problems, the present invention is based on a device for preventing unauthorized use of an engine provided with spark plugs and/or unauthorized use of the vehicle in which the engine is fitted, by removing the spark plug ignition cable and thereafter creating conditions which will enable a spark plug to be covered by the device and which will prevent removal of the device, or at least render removal difficult, wherein the device comprises a sleeve which can be fitted over and around a spark plug when the ignition cable has been removed and which has a part which coacts with the spark plug, wherein the sleeve and said part can be locked in mutual positions by means of a locking device or can be allowed to move relative to one another in a free, unlocked state.

According to the invention, the part that coacts with the spark plug can be moved relative to the sleeve in a direction of a sleeve centre line, from a position outside the sleeve in which the spark plug is exposed or can be embraced by the sleeve, to a position in which it is located inside the sleeve with the spark plug enclosed thereby, wherein said part can be freely rotated around the bottom cylindrical part of the enclosed spark plug, by means of mutually opposing shoulders.

According to preferred embodiments lying within the scope of the inventive concept, said part includes shoulders or lugs which can be brought into and out of abutment with the bottom cylindrical part of the spark plug, so that when inserted they encircle or embrace the cylindrical part of said spark plug at a location beneath a hexagonal portion thereof.

Preferably, said part will be spring-biassed towards a position located outside the sleeve.

When using the locking device, the aforesaid part will preferably be capable of being locked automatically to the sleeve in a position within said sleeve.

The aforesaid locking part includes two diametrically opposed, elongated, arm-like locking elements of which those portions that face towards the spark plug can be curved or displaced towards and away from one another as they are moved.

The locking device will also preferably include a spring-biassed disc or plate which is able to rotate to a part-locking position in relation to the sleeve in the internal position relative thereto, and which upon manipulation of a key belonging to the locking device can be turned back to release said part from the sleeve against the action of a spring.

Each of the aforesaid locking elements is provided with an obliquely downward extending projection which coacts with a spring unit and against which the ends of the spring rest, such as to move the locking elements to an outwardly directed position by the force of the spring when said locking part and the sleeve are separated from one another.

When in their outwardly directed position, the locking elements are latched against coaction with opposing inner sleeve surfaces.

It is also proposed that the sleeve is provided with a narrower, spark-plug embracing part, and a broader, locking-device embracing part, and that said disc or plate is located adjacent the narrower part and also adjacent the broader sleeve-part, said sleeve having a circular cross-section.

ADVANTAGES

Those advantages primarily afforded by the invention reside in the provisions of conditions whereby a spark plug can be locked solely by placing two locking elements, inserted in a sleeve-like part, over the spark plug and thereafter pressing the sleeve-like part over said locking elements against a spring force, therewith bending or flexing said locking elements in against the cylindrical base part of the spark plug in locking coaction therewith.

When the locking elements and the sleeve of the locking device are in a locking position, the locking elements are able to rotate around the spark plug and prevent its removal from the engine block.

The locking device enables the locking coaction between the locking elements and the sleeve to be deactivated, by moving the sleeve away from the spark plug against the force of a spring, so that the locking elements will expand and therewith enable the locking device to be removed from the spark plug.

The primary characteristic features of a device for preventing unauthorized use of an engine provided with spark plugs in accordance with the present invention are set forth in the characterizing clause of the following claim 1.

BRIEF DESCRIPTION OF THE DRAWING

An exemplifying embodiment of an inventive locking device at present preferred will now be described in more detail with reference to the accompanying drawing, in which FIG. 1 is a perspective view of an inventive locking device in an inactive position, immediately prior to its coaction with a spark plug;

FIG. 2 illustrates the locking device in an active and locking state in which the device coacts with the spark plug, although the spark plug has not been shown for the sake of simplicity;

FIG. 3 is a perspective view of the locking device from above;

FIG. 4 is a cross-sectional view of the locking device according to FIG. 2 and in broken lines according to FIG. 1;

FIGS. 5 and 6 are different projection views of one of two parts functioning as gripping means;

FIG. 7 is an end view of the part shown in FIG. 6;

FIG. 8 is a side view of a spacer sleeve for coaction with the locking device;

FIG. 9 is a side view of a locking-device turning means; and

FIG. 10 is a horizontal view of the turning means shown in FIG. 9.

DESCRIPTION OF EMBODIMENTS AT PRESENT PREFERRED

The present invention relates to a device 1 for preventing unauthorized use of an engine fitted with a spark plug 2.

The use of the device is contingent on the removal of an ignition cable from the spark plug 2 with the plug screwed firmly in the engine block as illustrated in FIG. 2.

Initially, the device 1 has the inactive state shown in FIG. 1 and is moved in the direction of arrow P to embrace the spark plug 2. In so doing, two locking elements 4, 5 movably mounted in a sleeve 6 are caused to embrace the spark plug 2 such that surfaces 4a, 5a on the locking elements will be caused to coact with a surface 3a of the engine block 3 located adjacent the spark plug 2.

The sleeve 6 is now pressed further down towards the block surface 3a, causing the locking elements 4 and 5 to be pressed towards one another, so that inwardly facing shoulders 4b, 5b will embrace a cylindrical base part 2a of the spark plug 2 located beneath a hexagonal section 2b and the top surface 3a of the block 3.

When in their innermost position, the shoulders 4b and 5b lie against the cylindrical base part 2a of the spark plug with a certain clearance in relation thereto, so that the sleeve 6 is able to rotate freely around said base part 2a.

The locking elements 4 and 5 can be locked relative to the sleeve 6 in the position shown in FIG. 2 with the aid of a locking device 7, thereby preventing the device 1 from being removed from the spark plug 2 by moving the device in a direction opposite to the illustrated direction P.

The locking part that coacts with the spark plug 2 and which is comprised of said two locking or gripping elements 4, 5, can be moved in a direction of a sleeve centre line 6a relative to the sleeve 6 from a position outside the sleeve, in which the spark plug is exposed or can be embraced by the sleeve, as shown in FIG. 1, to a position in which it is located inside the sleeve and embraces the spark plug 2, as shown in FIG. 2. As a result of the dimensions and the coaction of the shoulders 4b, 5b, the locking elements 4, 5 are able to rotate freely around the cylindrical base part 2a of the enclosed spark plug.

As will be understood, the shoulders 4b and 5b have a vertical extension or height which will enable the lower part of the sleeve 6 and a spring to bring the shoulders into and out of engagement with a hexagonal section 2b of the spark plug, wherein the shoulders will have a form which causes them to embrace partially the section 2a of the spark plug in an engaged position.

FIG. 4 is a cross-sectional view of the device when in the position shown in FIG. 2, wherein the sleeve 6 and its bottom part 6" enclose the locking elements 4, 5, which are mutually identical and a mirror image of one another.

The locking elements 4, 5 are spring-biassed by means of a spring 10 towards a position outside the sleeve 6, shown in broken lines in FIG. 4, FIG. 4 therefore showing said parts in a compressed state.

The locking device 7 coacts with a locking-part turning means 12 through the medium of a spacer 11, such as to lock the locking elements 4, 5 to the sleeve 6 in a position inside the sleeve, through the medium of the locking device 7 among other things, wherein the turning means 12 includes a recess having a surface 12a which is intended for latching coaction with a surface 5c.

The turning means 12 also includes a surface 12a' which is intended for coaction with a corresponding surface 4c on the locking part 4, therewith effecting simultaneous locking and release of the two locking elements 4 and 5 in relation to the sleeve 6.

The locking elements 4, 5 are comprised of two arm-shaped parts 4, 5 which are diametrically opposed in relation to the sleeve 6 and the lower portions of which can be flexed or bent towards and away from one another as the device 1 is moved in respective directions.

To this end, the locking element 5 has a web portion 5d and an upper guide portion 5e, wherein the part 5' can be bent or moved from the position shown in FIG. 4 to the position 5".

The locking elements 4 and 5 are thus bendable or movable towards and away from each other in response to said movement.

The turning device with which the locking device 7 coacts has the form of a disc (12) provided with pins 12b, 12b' which coact with a spring (not shown), wherein the spring force is directed so as to cause the disc 12 to rotate to a position in which the locking elements 4, 5 are locked in relation to the sleeve 6 in their sleeve-internal position. The disc 12 can be turned back against the spring force with the aid of a key 7' which fits the locking device 7, so as to loosen the locking elements 4, 5 from the sleeve 6 and enabling the spring 10 to move said elements 4, 5 to the position shown in FIG. 1.

Each of the locking elements 4, 5 is provided with an obliquely downward projection, which extends at an angle of about 15°, the projection of the locking element 5 being referenced 5f. The spring 10 rests against the projection 5f and the force exerted by the spring causes the locking elements 4, 5 to take an outwardly directed position in which the elements 4, 5 and the sleeve 6 are mutually spaced apart.

When in their outwardly directed position, the locking elements 4, 5 are latched in this expanded state through their coaction with the opposing inner edge-related or end-related inner surface parts 6a, 6b of the sleeve 6.

As shown in FIG. 4, the sleeve 6 has a bottom, narrower part 6" which is intended to enclose the locking elements 4, 5 which embrace the spark plug, and an upper, broader part 6' which is intended to enclose the locking device 7.

The disc 12 is located between the narrow part 6' and the broader part 6".

FIGS. 5 and 6 illustrate the locking element 5 in two separate projection views, while FIG. 7 is an end view of the locking element 5 shown in FIG. 6, with the configuration of the shoulder 5b and its attachment to the part 5' shown more clearly.

FIG. 8 illustrates a spacer part 11 having an upper part 11a which coacts with the locking device 7, and a lower part 11b which coacts with the turning means 12, said turning means having a centre axis 12c and two projections 12b, 12'.

Through their coaction with a spring (not shown), the projections urge the turning means 12 to a locking position and rest against the part 5e until it can turn to locking coaction with the surfaces 4c and 5c.

FIG. 10 illustrates the turning means 12 from above.

It will be understood that the invention is not restricted to the described and illustrated exemplifying embodiment thereof, and that modifications can be made within the scope of the inventive concept as defined in the following claims.

I claim:

1. A sparkplug locking device for preventing unauthorized use of an engine, the engine having a sparkplug, the sparkplug having a portion that is radially larger than adjacent portions of the sparkplug, the device comprising:

a sleeve having an internal opening;

a locking part, the locking part having radially movable shoulder portions, the shoulder portions extending inwardly toward a centerline of the locking part, the locking part being movable along an axis of the sleeve from a first position in which the shoulder portions are disposed outside of the sleeve and define a first opening to a second position in which at least part of the locking part is disposed inside of the internal opening of the sleeve and the shoulder portions define a second opening smaller than the first opening;

a locking device for locking the locking part to the sleeve when the locking part is disposed in the second position, the locking device including a spring-activated disc, the spring activated disc being rotatable by a key between a first disc position in which the locking part is locked relative to the sleeve when the locking part is disposed in the second position and a second disc position in which the locking part is released from the sleeve against a spring force; and a spring arrangement, the spring arrangement biasing the locking part toward the first position, wherein, when the locking part is in the first position, the sparkplug is adapted to be received between the shoulders of the locking part such that the shoulders are disposed beneath the radially larger portion of the sparkplug and, when the locking part is thereafter moved to the second position, the shoulders prevent axial movement of the shoulders to a position above the sparkplug, the sparkplug being rotatable relative to the locking part when the locking part is in the second position.

2. A device according to claim 1, wherein the locking part includes two diametrically opposed locking elements, the locking elements being radially moved towards and away from one another when the locking part is moved to the second and the first positions of the locking part, respectively.

3. A device according to claim 2, wherein each of the locking elements includes a respective obliquely downwardly extending projection in contact with a spring of the spring arrangement, wherein the spring urges the locking elements to an outwardly directed position when the locking part is in the first position of the locking part.

4. A device according to claim 3, wherein, when the locking elements are in the outwardly directed position, the locking elements are latched by coaction with opposing internal surfaces of the sleeve.

5. A device according to claim 1, wherein the sleeve includes a narrow spark-plug embracing part and a broader locking-device embracing part.

6. A device according to claim 5, wherein the disc of the locking device is located adjacent to the narrow part of the sleeve and adjacent the broad part of the sleeve within the sleeve, the sleeve having a circular cross-section.

7. A device as set forth in claim 1, wherein the shoulder portions are disposed at a first end of the locking part; and a portion of the locking part above the first end and the internal opening of the sleeve defining a space for receiving an extending portion of the sparkplug.

* * * * *